(12) United States Patent  
Nishimori et al.

(10) Patent No.: US 10,073,333 B2  
(45) Date of Patent: Sep. 11, 2018

(54) LIGHT IRRADIATION DEVICE, AND IMAGE DISPLAY EQUIPPED WITH THE SAME, FOR EMITTING LIGHT OF TWO OR MORE COMPONENTS BY LASER LIGHT

(71) Applicants: Takehiro Nishimori, Kanagawa (JP); Kazuhiro Fujita, Tokyo (JP); Toshiharu Murai, Kanagawa (JP); Tatsuya Takahashi, Tokyo (JP); Junichi Kitabayashi, Kanagawa (JP); Kaoru Itoh, Kanagawa (JP); Makoto Hirakawa, Kanagawa (JP)

(72) Inventors: Takehiro Nishimori, Kanagawa (JP); Kazuhiro Fujita, Tokyo (JP); Toshiharu Murai, Kanagawa (JP); Tatsuya Takahashi, Tokyo (JP); Junichi Kitabayashi, Kanagawa (JP); Kaoru Itoh, Kanagawa (JP); Makoto Hirakawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/233,037

(22) Filed: Aug. 10, 2016

(65) Prior Publication Data  
US 2016/0349606 A1 Dec. 1, 2016

Related U.S. Application Data

(63) Continuation of application No. PCT/JP2014/080793, filed on Nov. 20, 2014.

(30) Foreign Application Priority Data

Feb. 17, 2014 (JP) ................................. 2014-027911

(51) Int. Cl.  
*G03B 21/20* (2006.01)  
*G03B 21/14* (2006.01)  
(Continued)

(52) U.S. Cl.  
CPC ......... *G03B 21/204* (2013.01); *G02B 26/008* (2013.01); *G03B 21/14* (2013.01);  
(Continued)

(58) Field of Classification Search  
CPC .............. G03B 21/204; G03B 21/2033; G03B 21/2086; G03B 21/206; H04N 9/3161  
See application file for complete search history.

(56) References Cited

U.S. PATENT DOCUMENTS 6,028,660 A 2/2000 Van Der Laan et al.  
7,670,027 B2 3/2010 Nagamune  
(Continued)

FOREIGN PATENT DOCUMENTS

CN 102147561 A 8/2011  
EP 2270590 A1 1/2011  
(Continued)

OTHER PUBLICATIONS

Chinese Office Action and English translation thereof dated May 17, 2017.

(Continued)

*Primary Examiner* — Bao-Luan Le  
(74) *Attorney, Agent, or Firm* — Harness, Dickey & Pierce, P.L.C.

(57) ABSTRACT

A light irradiation device for emitting light of two or more components by laser light, which a laser light source emits, to an outside, includes a diffusion optical path change member configured to convert a first color component of the laser light into diffusion light and change an optical path of the first color component; a phosphor configured to generate fluorescence of a second color component different from the first color component based on the laser light, and change an optical path of the second color component; and an optical path switch member configured to switch between a first (Continued)

optical path for emitting the first color component to the outside and a second optical path for emitting the second color component to the outside. Light going straight at a light diffusion position of the diffusion optical path change member is not emitted to the outside.

15 Claims, 15 Drawing Sheets

(51) Int. Cl.
G03B 33/08 (2006.01)
H04N 9/31 (2006.01)
G02B 26/00 (2006.01)
G02B 27/14 (2006.01)

(52) U.S. Cl.
CPC ....... *G03B 21/206* (2013.01); *G03B 21/2033* (2013.01); *G03B 33/08* (2013.01); *H04N 9/3114* (2013.01); *H04N 9/3161* (2013.01); *G02B 27/141* (2013.01)

(56) References Cited

U.S. PATENT DOCUMENTS

| | | | |
|---|---|---|---|
| 7,967,452 B2 | 6/2011 | Itoh et al. | |
| 8,070,297 B2 | 12/2011 | Kamijima | |
| 8,157,398 B2 | 4/2012 | Yamamoto | |
| 8,366,278 B2* | 2/2013 | Kurosaki | G03B 21/204 250/486.1 |
| 8,444,275 B2* | 5/2013 | Kurtz | H04N 9/3105 353/85 |
| 8,723,142 B2* | 5/2014 | Kurosaki | G03B 21/204 250/483.1 |
| 8,926,109 B2* | 1/2015 | Lin | G03B 21/204 362/231 |
| 9,121,570 B2 | 9/2015 | Nishimori et al. | |
| 9,131,165 B2* | 9/2015 | Takahashi | G02B 27/141 |
| 9,223,194 B2 | 12/2015 | Fujita et al. | |
| 9,250,504 B2 | 2/2016 | Nishimori et al. | |
| 9,250,506 B2* | 2/2016 | Takahashi | G02B 27/10 |
| 9,279,566 B2 | 3/2016 | Nishimori et al. | |
| 9,348,200 B2* | 5/2016 | Takahashi | G03B 21/142 |
| 9,354,498 B2 | 5/2016 | Takahashi et al. | |
| 9,400,416 B2* | 7/2016 | Takahashi | G03B 21/142 |
| 9,442,352 B2* | 9/2016 | Nishimori | G03B 21/16 |
| 9,544,554 B2* | 1/2017 | Murai | H04N 9/3114 |
| 9,594,296 B2* | 3/2017 | Fujita | H04N 9/3111 |
| 2007/0230179 A1 | 10/2007 | Ripoll et al. | |
| 2008/0170207 A1 | 7/2008 | Egawa | |
| 2008/0198334 A1 | 8/2008 | Kasazumi et al. | |
| 2010/0328632 A1* | 12/2010 | Kurosaki | G03B 21/204 353/98 |
| 2011/0194038 A1 | 8/2011 | Kimura et al. | |
| 2012/0038892 A1* | 2/2012 | Kurtz | H04N 9/3105 353/31 |
| 2012/0243205 A1* | 9/2012 | Lin | G03B 21/204 362/84 |
| 2013/0010264 A1* | 1/2013 | Takahashi | H04N 9/3114 353/20 |
| 2013/0083297 A1 | 4/2013 | Miyazaki | |
| 2013/0100420 A1 | 4/2013 | Ferri et al. | |
| 2013/0100423 A1* | 4/2013 | Yamagishi | G03B 33/08 353/98 |
| 2013/0114044 A1* | 5/2013 | Inoue | G03B 21/204 353/31 |
| 2013/0278902 A1* | 10/2013 | Chen | G03B 21/204 353/31 |
| 2013/0308104 A1 | 11/2013 | Nishimori et al. | |
| 2014/0071182 A1* | 3/2014 | Takahashi | G02B 27/10 345/690 |
| 2014/0071407 A1* | 3/2014 | Takahashi | G03B 21/142 353/31 |
| 2014/0071408 A1* | 3/2014 | Takahashi | G02B 27/141 353/31 |
| 2014/0078472 A1* | 3/2014 | Masuda | G03B 21/142 353/31 |
| 2014/0240680 A1 | 8/2014 | Nishimori et al. | |
| 2014/0268068 A1 | 9/2014 | Takahashi et al. | |
| 2014/0268069 A1* | 9/2014 | Takahashi | G03B 21/142 353/31 |
| 2015/0036332 A1* | 2/2015 | Wang | F21V 13/14 362/231 |
| 2015/0042963 A1* | 2/2015 | Nishimori | G03B 21/16 353/57 |
| 2016/0062221 A1* | 3/2016 | Matsubara | G03B 21/2013 353/31 |

FOREIGN PATENT DOCUMENTS

| | | |
|---|---|---|
| JP | H11-504443 | 4/1999 |
| JP | 2006/098281 A1 | 9/2006 |
| JP | 2007-316607 | 12/2007 |
| JP | 2008-165995 | 7/2008 |
| JP | 2008-175858 | 7/2008 |
| JP | 2008-281670 | 11/2008 |
| JP | 2009-134217 | 6/2009 |
| JP | 4697559 | 6/2011 |
| JP | 2011-141562 | 7/2011 |
| JP | 2011-180477 | 9/2011 |
| JP | 2012118220 A | 6/2012 |
| JP | 2012-187358 | 10/2012 |
| JP | 2013-195838 | 9/2013 |
| JP | 5317074 | 10/2013 |
| JP | 2013-250494 | 12/2013 |
| JP | 2014-066991 | 4/2014 |

OTHER PUBLICATIONS

International Search Report dated Feb. 10, 2015 in PCT/JP2014/080793 filed on Nov. 20, 2014.
Extended European Search Report dated Nov. 14, 2016.

* cited by examiner

LIGHT IRRADIATION DEVICE, AND IMAGE DISPLAY EQUIPPED WITH THE SAME, FOR EMITTING LIGHT OF TWO OR MORE COMPONENTS BY LASER LIGHT

CROSS-REFERENCE TO RELATED APPLICATIONS

The present application is a continuation application of International Application No. PCT/JP2014/080793, filed Nov. 20, 2014, which claims priority to Japanese priority application No. 2014-027911 filed on Feb. 17, 2014. The contents of these applications are incorporated herein by reference in their entirety.

BACKGROUND OF THE INVENTION

1. Field of the Invention

The disclosures herein generally relate to a light irradiation device for irradiating laser light from a laser light source or light based on the laser light to the outside from a light output unit and an image display apparatus equipped with the same.

2. Description of the Related Art

A light irradiation device irradiating laser light or light based on the laser light to the outside from a light output unit is used for an image display apparatus such as a projector for projecting an image of a screen of a personal computer, a video image, or further, image data stored in a memory card or the like. The projector generally collects light emitted from a light irradiation device at an image formation member such as a micro mirror display element known as a digital micro-mirror device (DMD) or a liquid crystal plate, and displays an image on a screen. Conventionally, light irradiation devices each having high-intensity discharge lamps serving as light sources were mainly used for such projectors. However, recently, a projector using a laser light source such as a laser diode (LD) emitting laser light for a light source has been proposed (for example, Japanese Unexamined Patent Application Publication No. 2013-195838).

Regarding light irradiation devices equipped with laser light sources, in IEC 60825, that is the international standard of the International Electrotechnical Commission (IEC) or in JIS C6802:2005 that is the Japanese standard, laser products are classified, and guidelines to be followed by a manufacturer or a user are established for each class so as to enhance the safety of the laser products.

In a light irradiation device equipped with a laser light source, generally, a light diffusion member for diffusing laser light is provided on an optical path of laser light in order to prevent laser light emitted from a laser light source being directly irradiated to the outside. Then, light based on the laser light emitted from the laser light source is irradiated to the outside from a light output unit via an output optical path or two or more output optical paths including an optical path, through which diffusion light converted by the light diffusion member passes. As a result of laser light passing through the light diffusion member to be converted into diffusion light and emitted, safety is confirmed to be ensured even if the laser light source emits laser light with high intensity.

SUMMARY OF THE INVENTION

It is a general object of at least one embodiment of the present invention to provide a light irradiation device and an image display apparatus equipped with the same that substantially obviate one or more problems caused by the limitations and disadvantages of the related art.

According to an aspect of the present invention, a light irradiation device for emitting light of two or more components by laser light, which a laser light source emits, to an outside, includes a diffusion optical path change member configured to convert a first color component of the laser light into diffusion light and change an optical path of the first color component; a phosphor configured to generate fluorescence of a second color component different from the first color component based on the laser light, and change an optical path of the second color component; and an optical path switch member configured to switch between a first optical path for emitting the first color component, the optical path of which is changed by the diffusion optical path change member, to the outside and a second optical path for emitting the second color component, the optical path of which is changed by the phosphor, to the outside. Light going straight at a light diffusion position of the diffusion optical path change member is not emitted to the outside.

BRIEF DESCRIPTION OF THE DRAWINGS

Other objects and further features of embodiments will become apparent from the following detailed description when read in conjunction with the accompanying drawings, in which.

DESCRIPTION OF THE PREFERRED EMBODIMENTS

First Embodiment

In the following, an embodiment of the present invention (in the following, the present embodiment will be referred to as a "first embodiment") will be described in which a light irradiation device is used for a light irradiation device of a projector that is an example of an image display apparatus.

Figure 1:
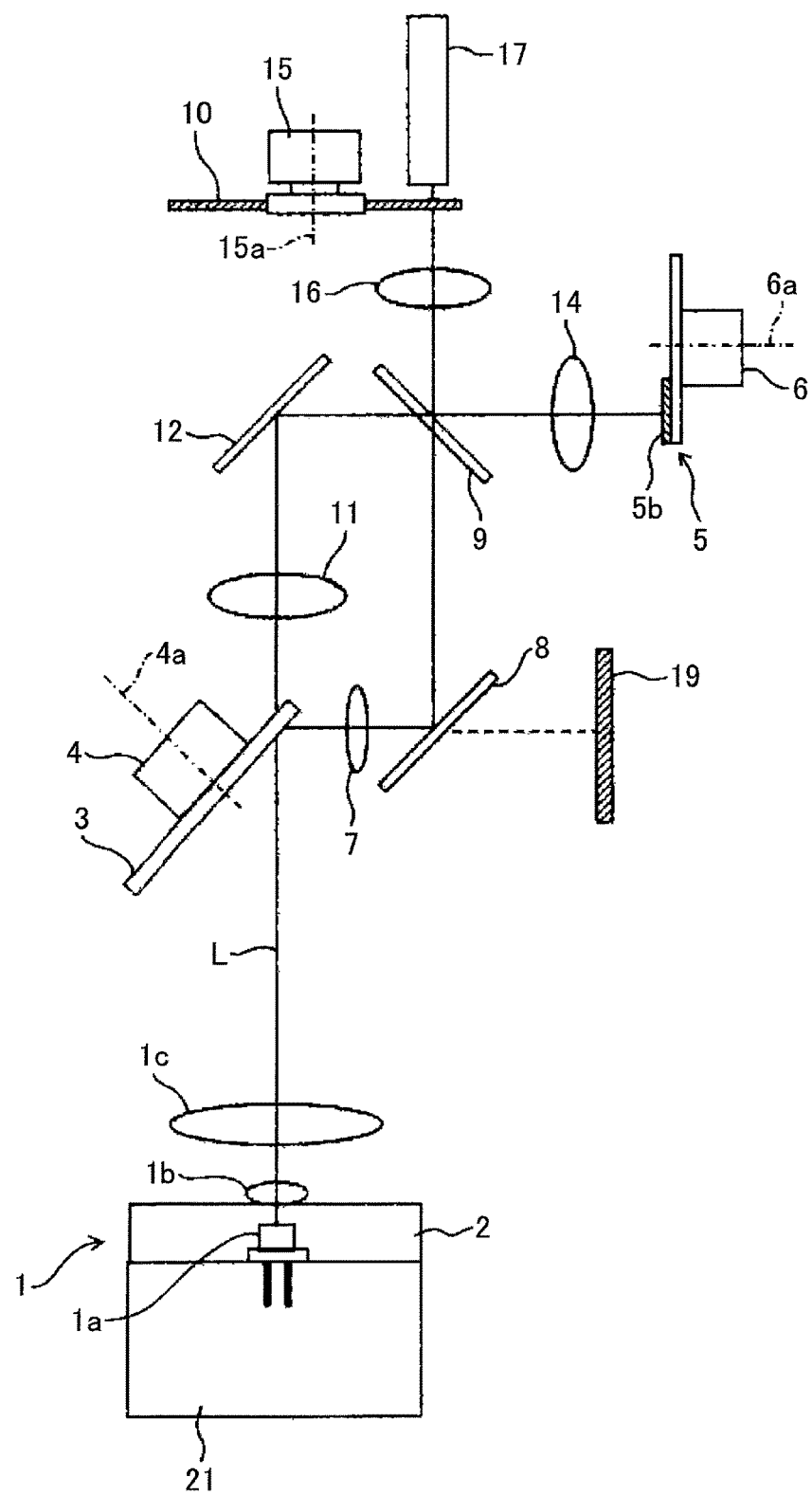
FIG. 1 is a schematic diagram depicting an example configuration of a part of a light irradiation device according to a first embodiment.

FIG. 1 is a schematic diagram depicting an example configuration of a part of a light irradiation device according to the first embodiment.

A light source unit 1, illustrated in FIG. 1, includes a laser diode 1a that is a laser light source, a coupling lens 1b and a condenser lens 1c. A laser diode 1a or two or more laser diodes 1a are arranged in a laser diode holder 2. On a back surface side of the laser diode holder 2, a heat sink (or a radiator plate) 21 for dissipating heat generated at the laser diode 1a is provided. A material of the heat sink 21 is a metal such as aluminum or copper.

Laser light from the laser diode 1a is condensed by the coupling lens 1b, and guided to the condenser lens 1c as a parallel light flux. The condenser lens 1c has a function of condensing laser light that has been made to be a parallel light flux by the coupling lens 1b. For the laser diode 1a in the first embodiment, although a case of a blue laser light source for outputting laser light of a blue component will be described as an example, a laser light source for outputting laser light of a green component or laser light of a red component may be used. Moreover, instead of the laser diode, another laser light source may be used.

Laser light of blue component condensed by the condenser lens 1c is guided to an optical path switching plate 3 that is an example of the optical path switching member. A spot size of laser light irradiated on the optical path switching plate 3 is properly defined so as to prevent color mixture or the like.

Figure 2:
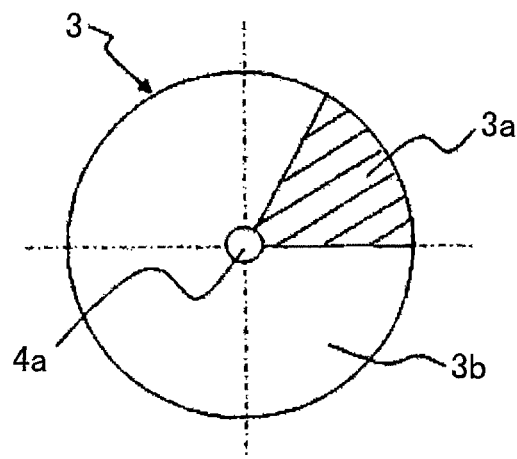
FIG. 2 is a plan view schematically depicting an example configuration of an optical path switching panel in the light irradiation device.

FIG. 2 is a plan view schematically depicting an example configuration of the optical path switching plate 3.

The optical path switching plate 3 is formed by, as illustrated in FIG. 2, a rotation disk for an optical path time division that has a reflection region 3a and a transparent region 3b that are divided in the rotational direction. The optical path switching plate 3 is arranged so that the plate surface is inclined with respect to a light axis of laser light of blue component output from the light source unit 1 (here, 45 degrees with respect to the light axis). The optical path switching plate 3 is, as illustrated in FIG. 1, rotationally driven around a rotation driving axis 4a by a stepping motor 4 as an example of a driving source.

In the reflection region 3a of the optical path switching plate 3, a reflection film is provided on a side of a plate surface, on which laser light of blue component is irradiated.

Moreover, in the transparent region 3b of the optical path switching plate 3, an antireflection film is provided on a side of a plate surface, which is irradiated with laser light of blue component.

Laser light of blue component passing through the transparent region 3b of the optical path switching plate 3 is guided to a phosphor wheel 5 that is an example of a wavelength change member by a condenser lens 11, a reflection mirror 12, a dichroic mirror 9, and a condenser lens 14. The condenser lens 11 has a function of condensing laser light of blue component transmitted by the transparent region 3b and converting it into a parallel light flux. The dichroic mirror 9 has a function of transmitting light of blue component and guiding it to the phosphor wheel 5, and a function of reflecting fluorescence of a color component other than blue component and guiding it to a color component switching plate 10. The condenser lens 14 has a function of condensing a parallel light flux onto the phosphor wheel 5 in a spot like form, and a function of condensing fluorescence from the phosphor wheel 5 and converting it into a parallel light flux.

The phosphor wheel 5 is formed by a rotation disk, and rotationally driven around a rotational driving axis 6a by a stepping motor 6 that is an example of a driving source. On the phosphor wheel 5, a phosphor film 5b is applied, which when being irradiated with laser light of blue component emitted from the light source unit 1, generates fluorescence including a green component (G) and a red component (R) that are different from blue component (B). For the phosphor film 5b, as described above, for example, a phosphor film that generates fluorescence of a yellow component (Y) of 450 nm or more and 750 nm or less, including a red component of a wavelength region of 580 nm or more and 750 nm or less and a green component of 450 nm or more and 600 nm or less, can be used.

According to rotation of the phosphor wheel 5, laser light is prevented from being irradiating continuously on the same part, and degradation of the phosphor film 5b is prevented. For a phosphor material of the phosphor film 5b, for example, a mixture of a phosphor material that is excited by irradiation of laser light of blue component and generates fluorescence of green component, and a material that is excited in the same way as above and generates fluorescence of red component (a phosphor material that generates yellow fluorescence) can be used, but is not limited to. For example, a phosphor material having a phosphor distribution characteristic extending over from a wavelength region of green component and a wavelength region of red component can be used.

Laser light of blue component passing through the transparent region 3b of the optical path switching plate 3, passes through the dichroic mirror 9 and is emitted to the phosphor wheel 5, and thereby the phosphor wheel 5 generates fluorescence including green component and red component. When fluorescence of green component and red component, generated in this way, is input to the dichroic mirror 9, the fluorescence is reflected at the dichroic mirror 9, condensed by a condenser lens 16, and guided to the color component switching plate 10.

Figure 3:
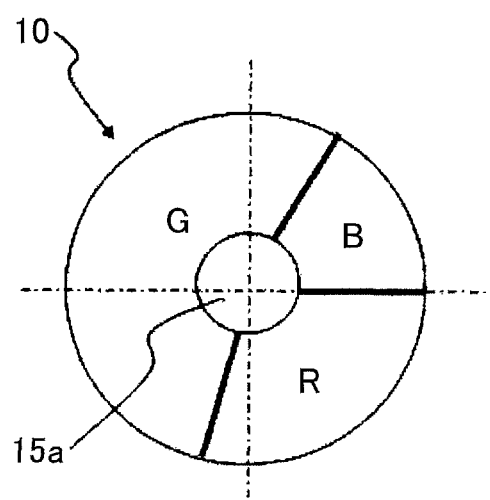
FIG. 3 is a plan view schematically depicting an example configuration of a color component switching panel in the light irradiation device.

FIG. 3 is a plan view schematically depicting an example configuration of the color component switching plate 10.

The color component switching plate 10 is formed by a rotation disk, and is rotationally driven in a rotational direction around the rotation driving axis 15a by a stepping motor 15 that is an example of a driving source. The color component switching plate 10 is formed, as illustrated in FIG. 3, by a rotation disk for a color component time division that has a first region (B) that transmits light of blue component in the rotational direction (in this example, a counterclockwise direction), a second region (G) that transmits fluorescence of green component and absorbs or reflects fluorescence of red component, and a third region (R) that transmits fluorescence of red component and absorbs or reflects fluorescence of green component, divided in the rotational direction and formed. Blue component transmission region of the color component switching plate 10 (i.e. the first region (B)) can be formed by a transparent glass plate or a notch portion. However, the first region may be formed by a filter that transmits only a specific wavelength band including the wavelength band of blue component. By using a filter, by changing shade a color reproduction range can be adjusted.

In fluorescence including green component and red component that is output from phosphor wheel 5 and guided to the color component switching plate 10, red component is cut by passing through the second region (G) of the color component switching plate 10, and thereby light of only green component passes through the color component switching plate 10 and is guided to a light tunnel 17 that is an example of the light output unit. Moreover, in fluorescence including green component and red component guided to the color component switching plate 10, green component is cut by passing through the third region (R) of the color component switching plate 10, and thereby light of only red component passes through the color component switching plate 10 and is guided to the light tunnel 17.

Figure 4:
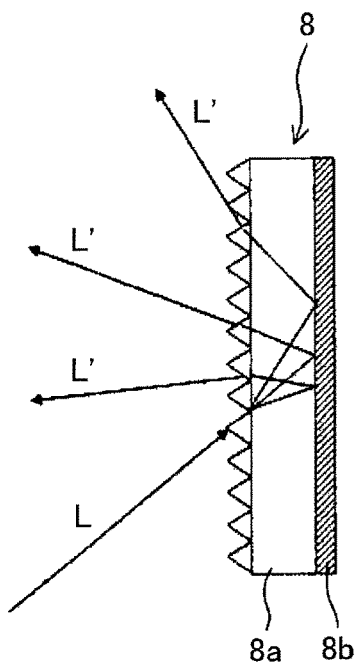
FIG. 4 is a cross-sectional diagram depicting an example configuration of a reflection diffusion plate in the first embodiment.

FIG. 4 is a cross-sectional view depicting an example configuration of the reflection diffusion plate 8 according to the first embodiment.

Laser light of blue component reflected in the reflection region 3a of the optical path switching plate 3 is converted by the condenser lens 7 into a parallel light flux, and reflected by the reflection diffusion plate 8 forming the reflection diffusion member that is an example of a diffusion optical path change member. In the reflection diffusion plate 8 according to the first embodiment, as illustrated in FIG. 4, a light transmission diffusion layer 8a that transmits and diffuses laser light L of blue component is formed on a base material 8b on which a mirror surface that is an example of the light reflection surface is formed. In the light transmission diffusion layer 8a, a light diffusion surface is formed on an input surface side of a plate-like light transmission member, and on the light diffusion surface an antireflection film is coated. The light transmission diffusion layer 8a has a function of converting input laser light L of blue component into diffusion light to remove coherency. The mirror surface on the base material 8b according to the first embodiment reflects light of wide wavelength range, but a dichroic mirror that reflects a part of wavelength band and transmits other wavelength band may be employed.

Figure 5:
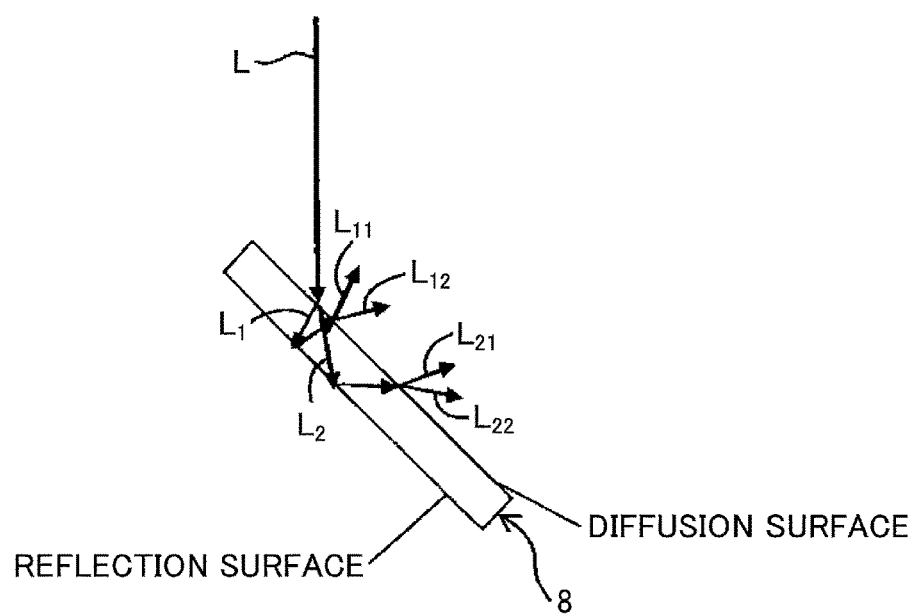
FIG. 5 is an explanation diagram depicting light diffused by the reflection diffusion plate.

FIG. 5 is an explanation diagram depicting light diffused by the reflection diffusion plate 8.

Laser light L entering the reflection diffusion plate 8 is diffused on a diffusion surface of the light transmission diffusion layer 8a of the reflection diffusion plate 8, to become first diffusion light fluxes $L_1$, $L_2$, and pass through the light transmission diffusion layer 8a. Afterwards, the first diffusion lights $L_1$, $L_2$ are reflected on a mirror surface on the base material 8b of the reflection diffusion plate 8, and pass through the light transmission diffusion layer 8a again and pass the diffusion surface. At this time, the first diffusion lights $L_1$, $L_2$ are diffused again, respectively, to become second diffusion lights $L_{11}$, $L_{12}$, $L_{21}$, $L_{22}$. In FIG. 5, an explanation is provided with an example illustrating with a few lights, but actually an infinite number of lights exist, and each light is diffused, to be a uniform light flux.

In this way, by using a reflection diffusion member, such as the reflection diffusion plate 8, for a light diffusion member for diffusing laser light L, diffusion shaping can be performed twice on a single diffusion surface, and high diffusion performance for laser light L can be obtained with the single diffusion surface. When a light transmissive material is used for the light diffusion member, in order to perform diffusion shaping twice, two diffusion surfaces are required. Therefore, there is an advantage that by using the reflection diffusion member as in the first embodiment, high diffusion performance can be obtained easily.

Because the reflection diffusion plate 8 of the first embodiment transmits laser light and a diffusing light transmission diffusion layer 8a is formed on the light reflection surface, the light reflection surface can be formed as a plane, a reflection coating can be applied easily, and high reflectance can be obtained. The reflection coating can be formed by coating with a dielectric multi-layer film or a metallic film, Laser light (diffusion light) L' of blue component which is reflected a diffused by the reflection diffusion plate 8 is guided to the dichroic mirror 9. Because the dichroic mirror 9 has, as described above, a function of transmitting light of blue component, the light reflected and diffused by the reflection diffusion plate 8 passes through the dichroic mirror 9, is condensed by the condenser lens 16, and thereafter, is guided to the color component switching plate 10. The laser light of blue component guided to the color component switching plate 10 in this way passes through the first region of the color component switching plate 10 and guided to the light tunnel 17.

The light tunnel 17 has a function of reducing light quantity unevenness. Instead of the light tunnel 17, another member such as a fly eye lens may be used. Light guided to the light tunnel 17 is guided by the light tunnel and emitted to the outside of the light irradiation device.

In the first embodiment, as illustrated in FIG. 1, at a destination to which laser light L of blue component emitted toward the reflection diffusion plate 8 goes straight at the light diffusion position according to the reflection diffusion plate 8 (i.e. installation position of the reflection diffusion plate 8), an absorption member 19 that is a laser light attenuation member which is an example of a laser light leakage prevention means for preventing the laser light L from leaking to the outside of the device remaining in an undiffused state is arranged. The absorption member 19 absorbs at least blue component by a predetermined amount or more. For example, a member on which black and non-reflective paint is applied can be used.

For the laser light leakage prevention means, not limited to the absorption means 19, a light shielding member for simply shielding laser light L of blue component may be used. As the light shielding member, the case itself of the light irradiation device may be used, or the light shielding member may be a member different from the case.

Figure 6:
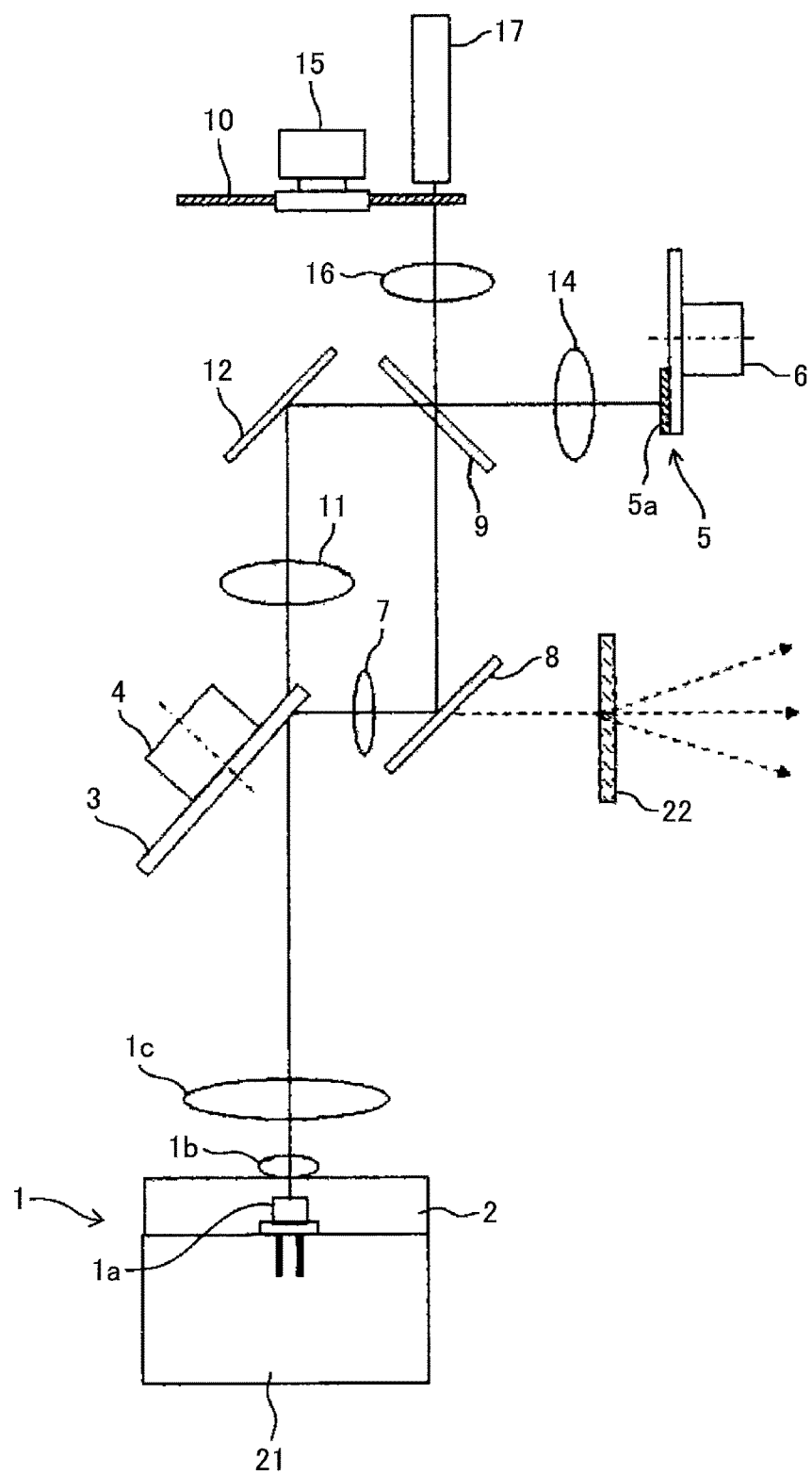
FIG. 6 is a schematic diagram depicting an example when a diffusion plate is used instead of a light absorption member as a laser light leakage prevention means.

Moreover, as illustrated in FIG. 6, as the laser light leakage prevention means, a diffusion plate 22 that is an example of a laser light diffusion member for diffusing laser light L may be used. The diffusion plate 22 has a light transmittivity. A diffusion surface is provided on a surface side which is irradiated with laser light L, and an antireflection film is formed on a side which laser light L enters. By arranging the diffusion plate 22, described as above, when laser light L passes through the diffusion plate 22, coherency is removed by an action of diffusion of the diffusion plate 22. Therefore, even if laser light (diffusion light) passing through the diffusion plate 22 leaks to the outside, there is no safety problem.

On an occurrence of an event that the reflection diffusion plate 8 is broken or drops off due to aging degradation, a shock or a vibration from outside, or the like, an event that laser light L from the light source unit 1 goes straight remaining in a non-diffused state at the light diffusion position according to the reflection diffusion plate (i.e. installation position of the reflection diffusion plate 8) can occur. However, in the first embodiment, there is not an output optical path in which laser light L from the light source unit 1 goes straight at the light diffusion position according to the reflection diffusion plate 8 (i.e. installation position of the reflection diffusion plate 8) to the light tunnel 17. Therefore, according to the first embodiment, even if the event that the reflection diffusion plate 8 is broken or drops off due to aging degradation, a shock or a vibration from outside, or the like, laser light L remaining in a non-diffused state is not emitted from the light tunnel 17 to the outside.

Moreover, in a configuration where there is an output optical path in which laser light L from the light source unit 1 goes straight at the light diffusion position according to the reflection diffusion plate 8 (i.e. installation position of the reflection diffusion plate 8) to the light tunnel 17, a laser light leakage prevention means such as the absorption member 19 or the diffusion member 22 cannot be arranged at a destination to which laser light L goes straight. When such a laser light leakage prevention means is arranged, the laser light leakage prevention means obstructs the output optical path.

In contrast, in the first embodiment, because there is not an output optical path in which laser light L from the light source unit 1 goes straight at the light diffusion position according to the reflection diffusion plate 8 (i.e. installation position of the reflection diffusion plate 8) to the light tunnel 17, a laser light leakage prevention means such as the absorption member 19 or the diffusion member 22 can be arranged at a destination to which laser light L goes straight. Therefore, on an occurrence of the event that due to a breakage or a drop-off of the reflection diffusion plate 8, laser light L from the light source unit 1 goes straight remaining in a non-diffused state at the light diffusion position according to the reflection diffusion plate 8 (i.e. installation position of the reflection diffusion plate 8), the laser light leakage prevention means can surely prevent the laser light L remaining in the non-diffused state from being emitted to the outside from a part other than the light tunnel 17 (gap in the case, a ventilation hole or the like).

Moreover, by using the reflection diffusion plate 8 such as the first embodiment, compared with a case of using a configuration where a transmission diffusion plate and a reflection mirror are combined, in addition to reduction of a number of components and low cost, space-saving can be achieved, and a small-size light irradiation device can be enabled.

Next, a configuration and operation of a projector that is an example of an image display apparatus installing the light irradiation device according to the first embodiment will be described.

Figure 7:
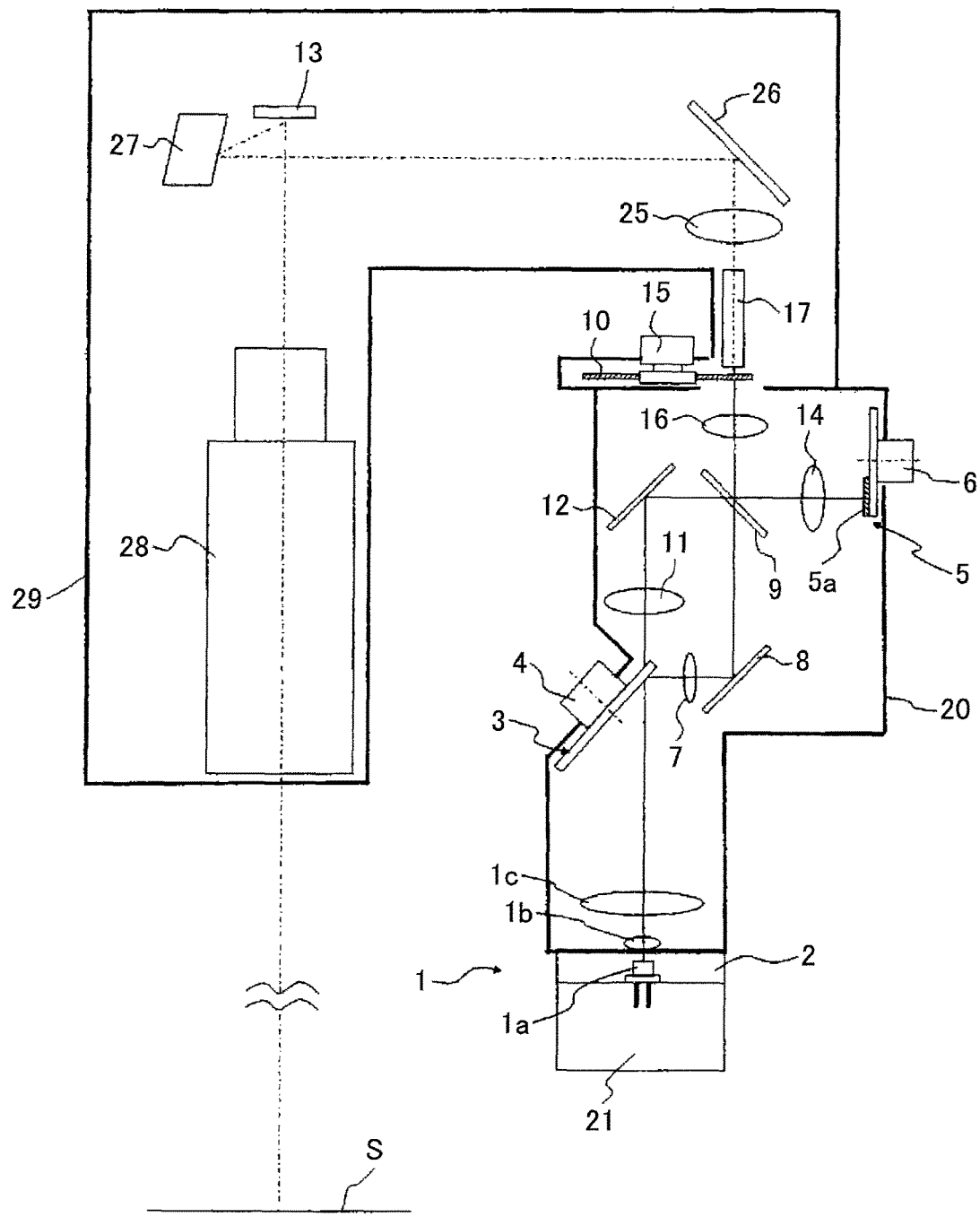
FIG. 7 is a schematic diagram depicting an example projector using the light irradiation device according to the first embodiment.

FIG. 7 is a schematic diagram depicting an example of a projector using the light irradiation device according to the first embodiment.

Light passing through the light tunnel 17 of the above-described light irradiation device is made to be a parallel light flux by a condenser lens 25 configuring an illumination optical system, thereafter the light is reflected by reflection mirrors 26, 27 configuring the illumination optical system, and is guided to an image formation panel 13 that is an example of an image formation member. The image formation panel 13 is controlled by a publicly known image formation unit (not illustrated), light of each color component is reflected by the image formation panel 13, and emitted to a screen S via a projection lens unit 28 configuring the illumination optical system. Therefore, a color image is enlarged and displayed on the screen S.

In the first embodiment, as an image formation panel 13, a panel of a reflection type that forms an image in response to modulation signals is exemplified. But a panel of a transmission type may be used. The light tunnel 17 is a representative example of a light quantity uniformizing means. Moreover, a projection lens unit 28 is a representative example of a projection optical system. Moreover, respective optical components arranged on the optical path between the color component switching plate 10 and the projection lens unit 28 are stored in a projection system case 29. Components between the light source unit 1 and the condenser lens 16 are stored in an illumination system case 20. A connection unit between the projection system case 29 and the illumination system case 20 has a configuration that is sealed so that light does not leak to the outside.

In FIG. 7, the illumination case 20 and the projection case 29 are formed separately. However, not limited to this, the illumination system case 20 and the projection system case 29 may be formed integrally as necessary. In the configuration illustrated in FIG. 7, a part of the illumination system case 20 existing at a destination, to which laser light L goes straight at the light diffusion position according to the reflection diffusion plate 8, serves a function as the laser light leaking prevention means that the absorption member 19 has.

[Variation]

Next, a variation of the light illumination device in the above-described first embodiment 1 will be described.

Because a basic configuration in the variation is the same as the above-described first embodiment, in the following, mainly a difference from the above-described first embodiment will be described.

Figure 8:
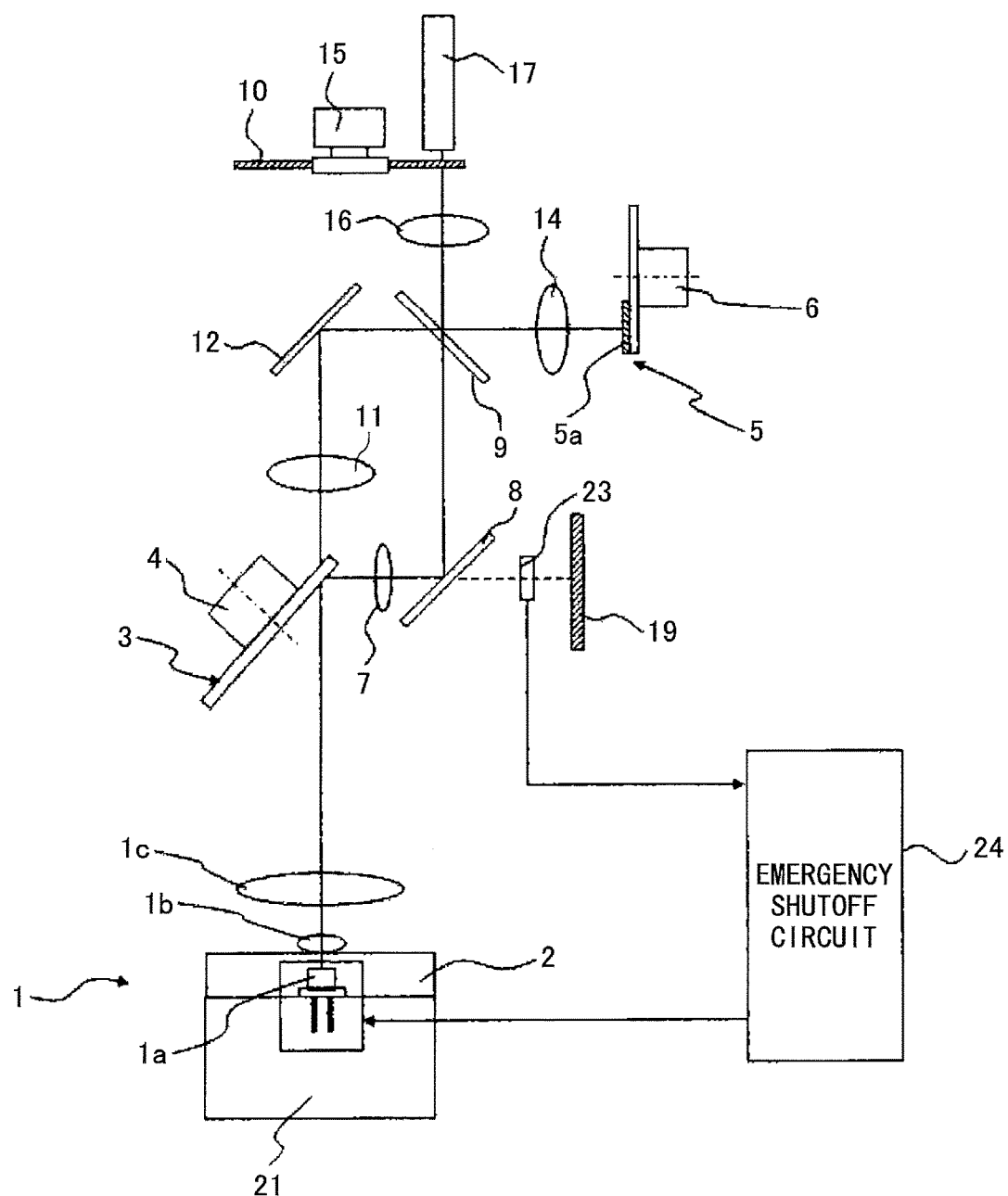
FIG. 8 is a schematic diagram depicting an example configuration of a part of a light irradiation device according to a variation.

FIG. 8 is a schematic diagram depicting an example configuration of a part of the light irradiation device according to the variation.

The variation is provided with a photo sensor 23 that is an example of a laser light detection means for detecting laser light L of blue component which goes straight at a light diffusion position according to the reflection diffusion plate (i.e. installation position of the reflection diffusion plate 8). Because the laser light detection means only has to detect laser light, not limited to the photo sensor 23, but, for example, the laser light detection means may detect change in temperature by using a temperature detection means, such as a thermistor. The photo sensor 23 is arranged between the reflection diffusion plate 8 and the absorption member 19.

Figure 9:
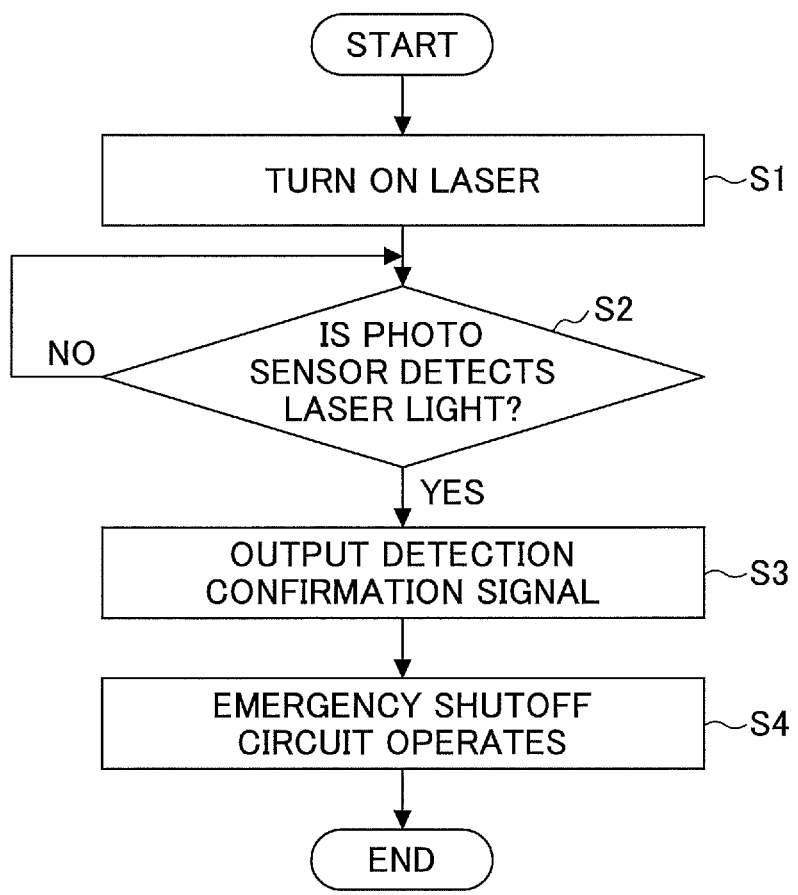
FIG. 9 is a flowchart for explaining an example of an operation according to the variation.

FIG. 9 is a flowchart for explaining an example of an operation according to the variation.

When a laser diode 1a of the light source unit 1 is driven to output laser light L of blue component (step S1), in a situation where an abnormality such as a drop-off or breakage of the reflection diffusion plate 8 does not occur, laser light L of blue component is properly reflected and diffused by the reflection diffusion plate 8, and the photo sensor 23 is not radiated with laser light L (step S2: NO). In contrast, when an abnormality that the reflection diffusion plate 8 is broken or drops off due to aging degradation, a shock or a vibration from outside, or the like, laser light L goes straight at the light diffusion position according to the reflection diffusion plate 8 and is emitted to the photo sensor 23 (step S2: YES). Then, from the photo sensor 23, a detection confirmation signal indicating detection of laser light L is output (step S3).

The detection confirmation signal output from the photo sensor 23 is sent to an emergency shutoff circuit 24 that is an example of a laser light stoppage control means. The emergency shutoff circuit 24 operates when the detection confirmation signal is received from the photo sensor 23 (step S4), and a power supply to the laser diode 1a is disconnected. Then, the output of laser light from the laser diode 1a of the light source unit 1 stops.

According to the variation, on an occurrence of an event that an abnormality occurs on the reflection diffusion plate 8 and laser light L from the light source unit 1 goes straight remaining in a non-diffused state at the light diffusion position according to the reflection diffusion plate (i.e. installation position of the reflection diffusion plate 8), output of laser light L from the light source unit 1 stops. Therefore, laser light L can be surely prevented from leaking to the outside remaining in the non-diffused state.

In most of the conventional light irradiation devices, the light diffusion member provided on an optical path of a laser light is light transmissive. In such a light irradiation device, for example, on an occurrence of an event that the light irradiation device falls and is severely damaged or the like, and that the light diffusion member falls or is broken, laser light from the laser light source may pass a light diffusion position according to the light diffusion member in a non-diffused state. In this case, a problem occurs that laser light emitted from the laser light source can be directly irradiated to the outside.

According to the present invention, even when a light diffusion member provided on an optical path of laser light falls or is broken and laser light passes a light diffusion position according to the light diffusion member in a non-diffused state, laser light can be prevented from being directly irradiated to the outside from the light output unit.

Second Embodiment

Next, another embodiment (in the following, referred to as "second embodiment") will be described in which the light irradiation device according to the present invention is used as a light irradiation device of a projector that is an example of an image display apparatus.

Because a basic configuration in the second embodiment is the same as in the first embodiment, mainly a difference from the first embodiment will be described in the following.

Figure 10:
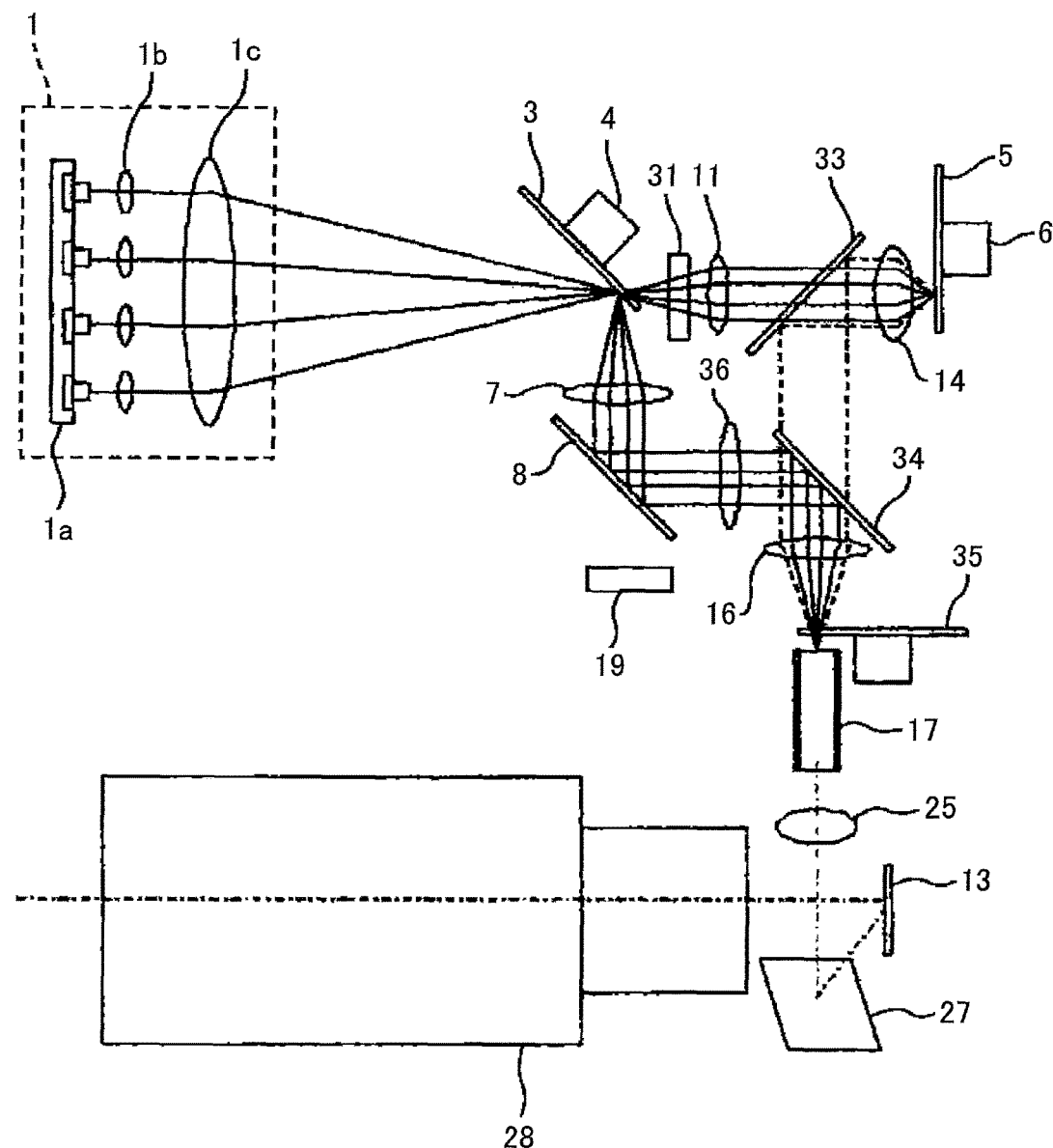
FIG. 10 is a schematic diagram depicting an example configuration of a part of a light irradiation device according to a second embodiment.

FIG. 10 is a schematic diagram depicting an example configuration of a part of a light irradiation device according to the second embodiment.

The optical path according to the second embodiment when light of blue component (B) is emitted will be described. Laser light L of blue component (B) output from the light source unit 1 is condensed by the condenser lens 1c and focused on approximately one point on the optical path switching plate 3, and reflected in the reflection region 3a on the optical path switching plate 3. Therefore, the light is guided to the reflection diffusion plate 8 through the lens 7, reflected and diffused by the reflection diffusion plate 8, and thereafter, guided to a second dichroic mirror 34. The second dichroic mirror 34 has a function of reflecting light of blue component and a function of transmitting fluorescence of a color component other than blue component. Therefore, light of blue component guided to the second dichroic mirror 34 is reflected at the second dichroic mirror 34 and guided to the color component switching plate 35.

Figure 11:
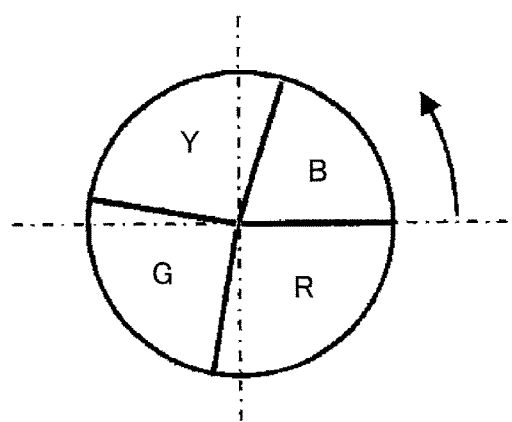
FIG. 11 is a plan view schematically depicting an example configuration of a color component switching panel according to the second embodiment.

FIG. 11 is a plan view schematically depicting an example configuration of the color component switching plate 35 according to the second embodiment.

Although a basic configuration of the color component switching plate 35 according to the second embodiment is the same as in the first embodiment, as illustrated in FIG. 11, in a rotational direction indicated by an arrow (in this example, a counterclockwise direction), in addition to a first region (B) that transmits light of blue component, a second region (G) that transmits fluorescence of green component and absorbs or reflects fluorescence of red component, and a third region (R) that transmits fluorescence of red component and absorbs or reflects fluorescence of green component, a fourth region (Y) that absorbs or reflects light of blue component are formed on a rotational disk for a color component time division that is formed by dividing in the rotational direction. In this example, the fourth region (Y) is formed on the rotational direction between the first region (B) and the second region (G).

Light of blue component (B) guided to the color component switching plate 35 passes through the first region (B) of the color component switching plate 35 and guided to the light tunnel 17. The light of blue component (B) passing through the color component switching plate 35 is injected into the light tunnel 17 and becomes uniform light, and thereafter, injected to the image formation panel 13 through the lens 25 and the mirror 27, and projected onto a screen through the projection lens unit 28.

Next, optical path according to the second embodiment when lights of red component (R), green component (G) and yellow component (Y) are emitted will be described.

Laser light L of blue component (B) output from the light source unit 1 is condensed by the condenser lens 1c and focused on approximately one point on the optical path switching plate 3, and passes through the transparent region 3b on the optical path switching plate 3. Laser light L of blue component (B) passing through the transparent region 3b on the optical path switching plate 3 becomes diffusion light when passing through a transmission diffusion plate 31, and thereafter, guided to a first dichroic mirror 33 through a lens 11. The first dichroic mirror 33 has a function of transmitting light of blue component and a function of reflecting fluorescence of a color component other than blue component. Therefore, light of blue component guided to the first dichroic mirror 33 passes through the first dichroic mirror 33 and guided to the phosphor wheel 5.

In the second embodiment, by arranging the transmission diffusion plate 31, laser light L from the light source unit 1 is diffused by the transmission diffusion plate 31, and then, emitted to the optical components of the subsequent stage, such as the lens 11, the phosphor wheel 5 or the like. Therefore, compared with the case where laser light L in a non-diffused state is directly emitted, a breakage or the like of the lens 11 or the phosphor wheel 5 due to a rise in temperature by focusing light on one point can be prevented.

When light of blue component is emitted to the phosphor wheel 5, fluorescence of yellow component (Y) including both red component (R) and green component (G) is generated. The fluorescence of yellow component (Y) is condensed by the lens 14, and thereafter, reflected at the first dichroic mirror 33 and guided to the second dichroic mirror 34. The fluorescence of yellow component (Y) guided to the second dichroic mirror 34 passes through the second dichroic mirror 34 and guided to the color component switching plate 35.

From the fluorescence of yellow component (Y) output from the phosphor wheel 5 and guided to the color component switching plate 35, by passing through the second region (G) of the color component switching plate 35, red component is removed, and light of only green component passes through the color component switching plate 35 and is guided to the light tunnel 17 that is an example of a light output unit. Therefore, light of green component (G) is injected into the light tunnel 17 and becomes uniform light, and thereafter, injected to the image formation panel 13 through the lens 25 and the mirror 27, and projected onto a screen through the projection lens unit 28.

Moreover, from fluorescence of yellow component (Y), by passing through the third region (R) of the color component switching plate 35, green component is removed, and light of only red component passes through the color component switching plate 35 and is guided to the light tunnel 17 that is an example of the light output unit. Therefore, light of red component (R) is injected into the light tunnel 17 and becomes uniform light, and thereafter, injected to the image formation panel 13 through the lens 25 and the mirror 27, and projected onto a screen through the projection lens unit 28.

Moreover, by fluorescence of yellow component (Y) passing through the fourth region (Y) of the color component switching plate 35, light of yellow component (Y) including green component (G) and red component (R) passes through the color component switching plate 35 and is guided to the light tunnel 17 that is an example of the light output unit. Therefore, light of yellow component (Y) is injected into the light tunnel 17 and becomes uniform light, and thereafter, injected to the image formation panel 13 through the lens 25 and the mirror 27, and projected onto a screen through the projection lens unit 28.

On an occurrence of an event that the reflection diffusion plate 8 is broken or drops off due to aging degradation, a shock or a vibration from outside, or the like, an event that laser light L from the light source unit 1 goes straight remaining in a non-diffused state at the light diffusion position according to the reflection diffusion plate 8 (i.e. installation position of the reflection diffusion plate 8) can occur. However, also in the second embodiment, there is not an output optical path in which laser light L from the light source unit 1 goes straight at the light diffusion position according to the reflection diffusion plate 8 (i.e. installation position of the reflection diffusion plate 8) to the light tunnel 17. Therefore, according to the second embodiment, even if the event that the reflection diffusion plate 8 is broken or drops off due to aging degradation, a shock or a vibration from outside, or the like, laser light L remaining in a non-diffused state is not emitted from the light tunnel 17 to the outside. Furthermore, in the same way as the first embodiment, because at a destination to which laser light L from the light source unit remaining in a non-diffused state goes straight at the light diffusion position according to the reflection diffusion plate 8 (i.e. installation position of the reflection diffusion plate 8), an absorption member 19 is arranged, the laser light L remaining in the non-diffused state is surely prevented from being emitted to the outside from a part other than the light tunnel 17 (gap in the case, a ventilation hole or the like).

Also in the second embodiment, instead of the absorption member 19, another laser light leaking prevention means, such as the diffusion plate 22, or a member using a part of the illumination system case 20, may be used. Moreover, as in the variation, a configuration in which a photo sensor 23 or an emergency shutoff circuit 24 is installed may be employed.

Third Embodiment

Next, yet another embodiment (in the following, referred to as "third embodiment") will be described in which the light irradiation device according to the present invention is used as a light irradiation device of a projector that is an example of an image display apparatus.

Because a basic configuration in the third embodiment is the same as in the second embodiment, mainly a difference from the second embodiment will be described in the following.

Figure 12:
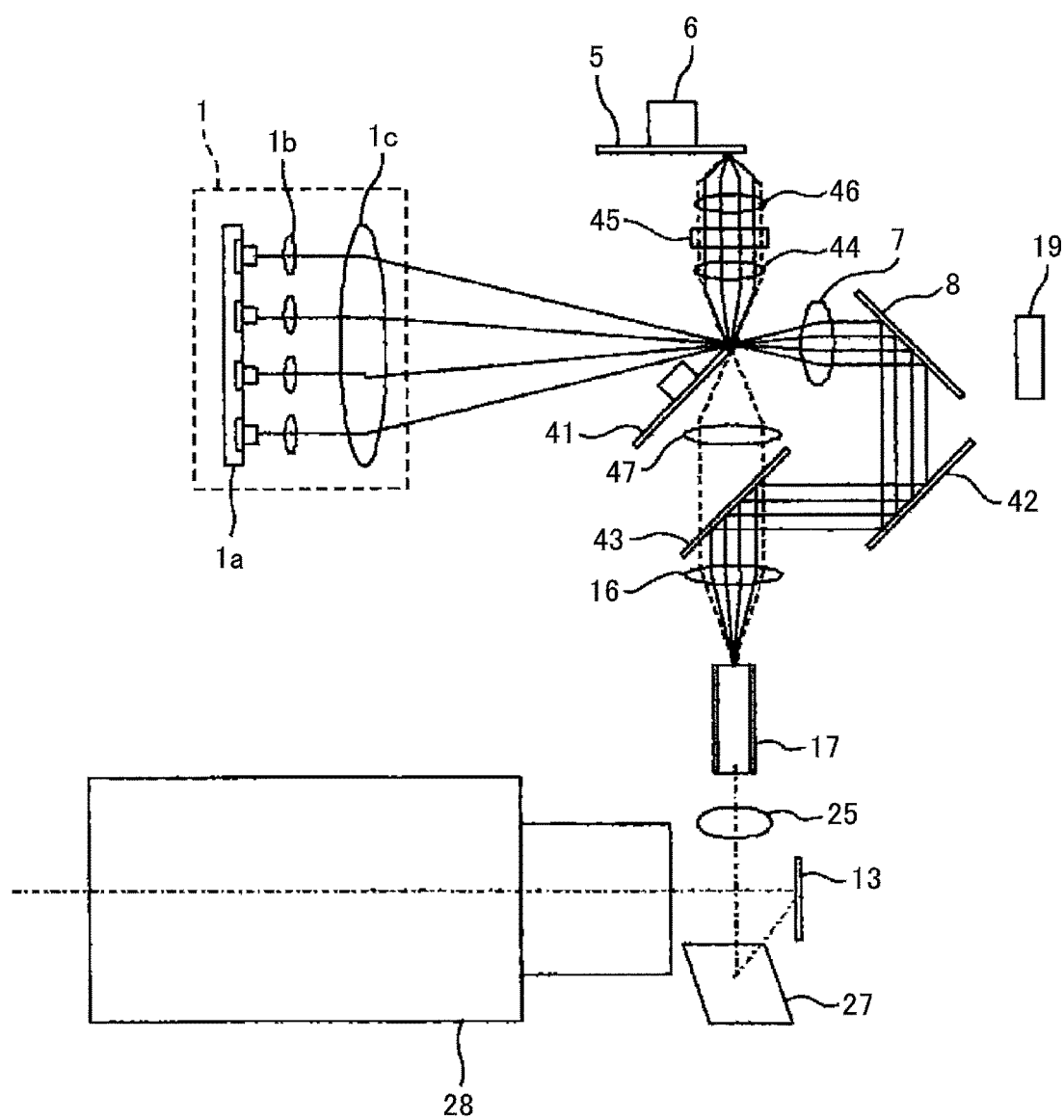
FIG. 12 is a schematic diagram depicting an example configuration of a part of a light irradiation device according to a third embodiment.

FIG. 12 is a schematic diagram depicting an example configuration of a part of the light irradiation device according to the third embodiment. Moreover, FIG. 13 is a plan view schematically depicting an example configuration a color component/optical path switching plate 41 according to the third embodiment.

Figure 13:
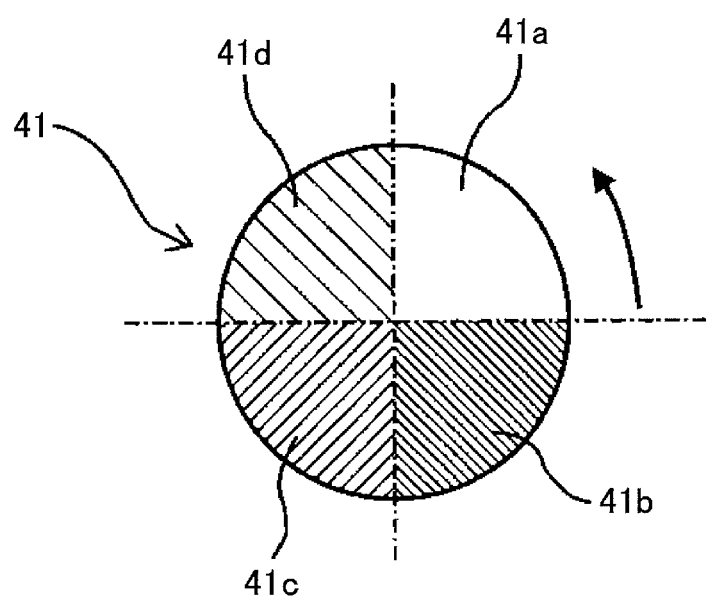
FIG. 13 is a plan view schematically depicting an example configuration of a color component/optical path switching panel according to the third embodiment.

The color component/optical path switching plate 41 according to the third embodiment, as illustrated in FIG. 13, is formed by a rotational disk for an optical path time division having a blue component transparent region 41*a*, a red component transparent region 41*b*, a green component transparent region 41*c* and a yellow component transparent region 41*d*, divided in a rotational direction indicated by an arrow (in this example, a counterclockwise direction). The blue component transparent region can be formed by a transparent glass or a notch. Any of the other regions 41*b*, 41*c*, 41*d* reflect blue component (B). Each of the other regions 41*b*, 41*c* 41*d* is formed by a dichroic mirror that transmits only red component (R), green component (G) or yellow component. The color component/optical path switching plate 41 according to the third embodiment is equally divided into four regions 41*a*, 41*b*, 41*c* and 41*d* (segment angle is 90°). However, angles of the respective regions are not limited to this. Depending on color design of a projector that uses the light irradiation device, optimum values for the segment angles may be selected.

The optical path according to the third embodiment when light of blue component (B) is emitted will be described. Laser light L of blue component (B) output from the light source unit 1 is condensed by the condenser lens 1*c* and focused on approximately one point on the color component/optical path switching plate 41. The laser light L of blue component (B) guided to the color component/optical path switching plate 41 passes through the blue component transparent region 41*a* on the color component/optical path switching plate 41, and thereafter, guided to the reflection diffusion plate 8 through the lens 7, and reflected and diffused by the reflection diffusion plate 8, and thereafter, reflected at the reflection mirror 42 and guided to the dichroic mirror 43. The dichroic mirror 43 has a function of reflecting light of blue component and a function of transmitting fluorescence of a color component other than blue component. Therefore, light of blue component guided to the dichroic mirror 43 is reflected at the dichroic mirror 43 and guided to the light tunnel 17 via the lens 16. Then, light of blue component is injected into the light tunnel 17 and becomes uniform light, and thereafter, injected to the image formation panel 13 through the lens 25 and the mirror 27, and projected onto a screen through the projection lens unit 28.

Next, optical path according to the third embodiment when lights of red component (R), green component (G) and yellow component (Y) are emitted will be described.

Laser light L of blue component (B) output from the light source unit 1 is condensed by the condenser lens 1c and focused on approximately one point on the color component/optical path switching plate 41, and reflected at the red component transparent region 41b on the color component/optical path switching plate 41, and guided to the phosphor wheel 5 passing through a lens 44, a transmission diffusion plate 45 and a lens 46. Also in the third embodiment, by arranging the transmission diffusion plate 45, in the same way as in the second embodiment, laser light L from the light source unit 1 is diffused by the transmission diffusion plate 31, and then, emitted to the optical components of the subsequent stage, such as the lens 46, the phosphor wheel 5 or the like. Therefore, compared with the case where laser light L in a non-diffused state is directly emitted, a breakage or the like of the lens 46 or the phosphor wheel 5 due to a rise in temperature by focusing light on one point can be prevented.

When light of blue component is emitted to the phosphor wheel 5, fluorescence of yellow component (Y) including both red component (R) and green component (G) is generated. The fluorescence of yellow component (Y) passes through the lens 44, the transmission diffusion plate 45 and the lens 46 and is guided to the color component/optical path switching plate 41. From the fluorescence of yellow component (Y), when passing through the red component transparent region 41b on the color component/optical path switching plate 41, color component other than red component is removed. Therefore, light of red component passes through the lens 47, is guided to the dichroic mirror 43, passes through the dichroic mirror 43, and is guided to the light tunnel 17. Then, light of red component is injected into the light tunnel 17 and becomes uniform light, and thereafter, injected to the image formation panel 13 through the lens 25 and the mirror 27, and projected onto a screen through the projection lens unit 28.

Moreover, from fluorescence of yellow component (Y), when passing through the green component transparent region 41c on the color component/optical path switching plate 41, color component other than green component is removed, and light of green component is guided to the dichroic mirror 43 through the lens 47. Then, light of green component passes through the dichroic mirror 43, is guided to the light tunnel 17, is injected into the light tunnel 17 and becomes uniform light, and thereafter, injected to the image formation panel 13 through the lens 25 and the mirror 27, and projected onto a screen through the projection lens unit 28.

Moreover, when fluorescence of yellow component (Y) passes through the yellow component transparent region 41d on the color component/optical path switching plate 41, color component other than yellow component is removed, light of yellow component is guided to the dichroic mirror 43 through the lens 47. Then, light of yellow component passes through the dichroic mirror 43, is guided to the light tunnel 17, injected into the light tunnel 17 and becomes uniform light, and thereafter, injected to the image formation panel 13 through the lens 25 and the mirror 27, and projected onto a screen through the projection lens unit 28.

On an occurrence of an event that the reflection diffusion plate 8 is broken or drops off due to aging degradation, a shock or a vibration from outside, or the like, an event that laser light L from the light source unit 1 goes straight remaining in a non-diffused state at the light diffusion position according to the reflection diffusion plate 8 (i.e. installation position of the reflection diffusion plate 8) can occur. However, also in the third embodiment, there is not an output optical path in which laser light L from the light source unit 1 goes straight at the light diffusion position according to the reflection diffusion plate 8 (i.e. installation position of the reflection diffusion plate 8) to the light tunnel 17. Therefore, according to the third embodiment, even if the event that the reflection diffusion plate 8 is broken or drops off due to aging degradation, a shock or a vibration from outside, or the like, laser light L remaining in a non-diffused state is not emitted from the light tunnel 17 to the outside. Furthermore, in the same way as the first and second embodiments, because at a destination to which laser light L from the light source unit remaining in a non-diffused state goes straight at the light diffusion position according to the reflection diffusion plate 8 (i.e. installation position of the reflection diffusion plate 8), an absorption member 19 is arranged, the laser light L remaining in the non-diffused state is surely prevented from being emitted to the outside from a part other than the light tunnel 17 (gap in the case, a ventilation hole or the like).

Also in the third embodiment, instead of the absorption member 19, another laser light leaking prevention means, such as the diffusion plate 22, or a member using a part of the illumination system case 20, may be used. Moreover, as in the variation, a configuration in which a photo sensor 23 or an emergency shutoff circuit 24 is installed may be employed.

Here, in the third embodiment, the color component switching plate 10, 35 which is provided in the first or second embodiment is not provided. This is because the color component/optical path switching plate 41 has a function of the color component switching plate 10, 35. Therefore, in addition to reduction of a number of components and cost reduction, space saving can be achieved and a small sized light irradiation device can be provided. Furthermore, in the configuration, as in the first and second embodiments, where the optical path switching plate 3 and the color component switching plate 10, 35 are provided separately, a rotation synchronization control between the optical path switching plate 3 and the color component switching plate 10, 35 is required. However, according to the third embodiment, such a rotation synchronization control becomes unnecessary, and a control can be simplified.

Moreover, in the third embodiment, the reflection diffusion plate 8 and the reflection mirror 42 may be exchanged and arranged. In this case, in accordance with the exchange of arrangement between the reflection diffusion plate 8 and the reflection mirror 42, the installation position of the absorption member 19 may be changed.

Moreover, in the third embodiment, not only the reflection diffusion plate 8, but also the reflection mirror 42 may be formed by a reflection diffusion plate. In this case, for light of blue component, greater diffusion effect can be obtained. Even when a second reflection diffusion plate arranged at the position of the reflection mirror 42 drops off or the like, light to be injected to the second reflection diffusion plate has already been diffused by the reflection diffusion plate 8, and a laser light leaking prevention means such as the absorption member 19 is not necessary to be arranged at a destination to which the light goes straight due to the drop-off or the like of the second reflection diffusion plate.

Moreover, in the third embodiment, reflection surfaces of the red component transparent region 41b, the green component transparent region 41c, and the yellow component transparent region 41d on the color component/optical path switching plate 41 may serve as reflection diffusion surfaces. Therefore, because the transmission diffusion plate 45 becomes unnecessary, the number of components is reduced, cost reduction and size reduction of the light irradiation device can be achieved.

First Reference Example

Next, a reference example of a light irradiation device used in a projector that is an example of an image display apparatus (in the following, the present reference example is referred to as "first reference example") will be described.

Because a basic configuration in the first reference example is the same as in the second embodiment, mainly a difference from the second embodiment will be described in the following.

Figure 14:
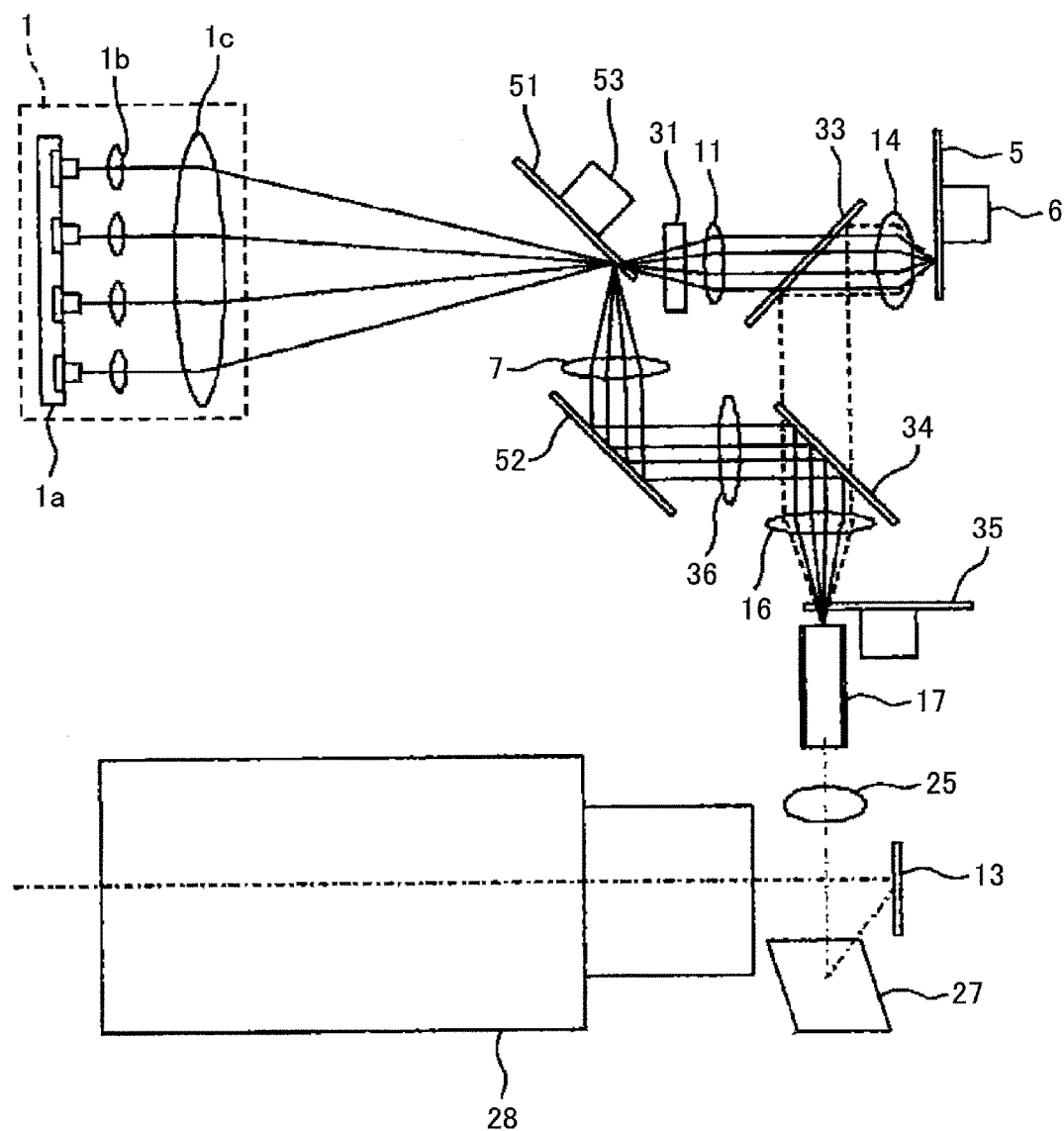
FIG. 14 is a schematic diagram depicting an example configuration of a part of a light irradiation device according to a first reference example.

FIG. 14 is a schematic diagram depicting an example configuration of a part of a light irradiation device according to the first reference example. Moreover, FIG. 15 is a plan view schematically depicting an example configuration of an optical path switching plate 51 according to the first reference example.

Figure 15:
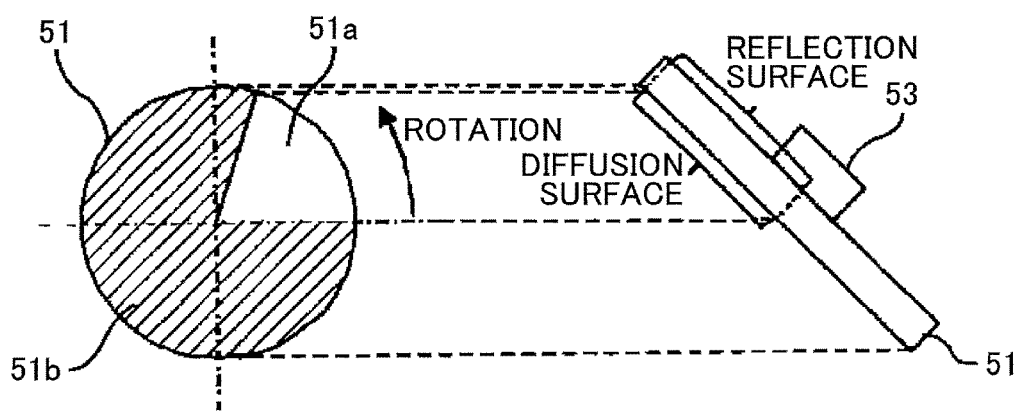
FIG. 15 is a plan view schematically depicting an example configuration of an optical path switching panel according to the first reference example.

The optical path switching plate 51 according to the first reference example, as illustrated in FIG. 15, is formed by a rotation disk for an optical path time division having a reflection diffusion region 51a and a transmission region 51b divided in a rotational direction. The reflection diffusion region 51a according to the first reference example is formed of the same reflection diffusion member as the above-described reflection diffusion plate 8.

Because the reflection diffusion region 51a in the optical path switching plate 51 according to the first reference example is formed of a reflection diffusion member, the reflection diffusion plate 8 provided in the second embodiment can be omitted, and instead of the reflection diffusion plate 8 a general reflection mirror 52 that is not provided with the light diffusion function is installed. Needless to say, the reflection diffusion plate 8 may be arranged instead of the reflection mirror 52. In this case, for light of blue component, greater diffusion effect can be obtained. Moreover, in this case, even when the reflection diffusion plate 8 arranged instead of the reflection mirror 52 drops off or the like, light to be injected to the reflection diffusion plate 8 has already been diffused by the reflection diffusion region 51a on the optical path switching plate 51, and a laser light leaking prevention means such as the absorption member 19 is not necessary to be arranged at a destination to which the light goes straight due to the drop-off or the like of the reflection diffusion plate 8.

Moreover, in the first reference example, in order to diffuse later light L of blue component in the reflection diffusion region 51a on the optical path switching plate 51, a reflection diffusion part irradiated with laser light L of blue component temporally changes according to a rotation of the optical path switching plate 51. According to the temporal change of the part that diffuses laser light, an illuminance distribution on the screen varies with time. As a result, unevenness of a projection image is averaged temporally, and a uniform image can be obtained. Therefore, compared with the case where the same part is always irradiated with laser light L of blue component such as the reflection diffusion plate 8 in the second embodiment, an effect of uniformizing an image can be enhanced. As a result, a diffusion angle required for obtaining a uniform image can be made smaller, an illumination optical system can be formed without causing degradation of efficiency due to an increase of a subsequent optical system or vignetting of diffusion light. Therefore, an illumination optical system, which is small and has high efficiency while obtaining a uniform image, can be provided.

Second Reference Example

Next, another reference example of a light irradiation device used in a projector that is an example of an image display apparatus (in the following, the present reference example is referred to as "second reference example") will be described.

Because a basic configuration in the second reference example is the same as in the first reference example, mainly a difference from the first reference example will be described in the following.

Figure 16:
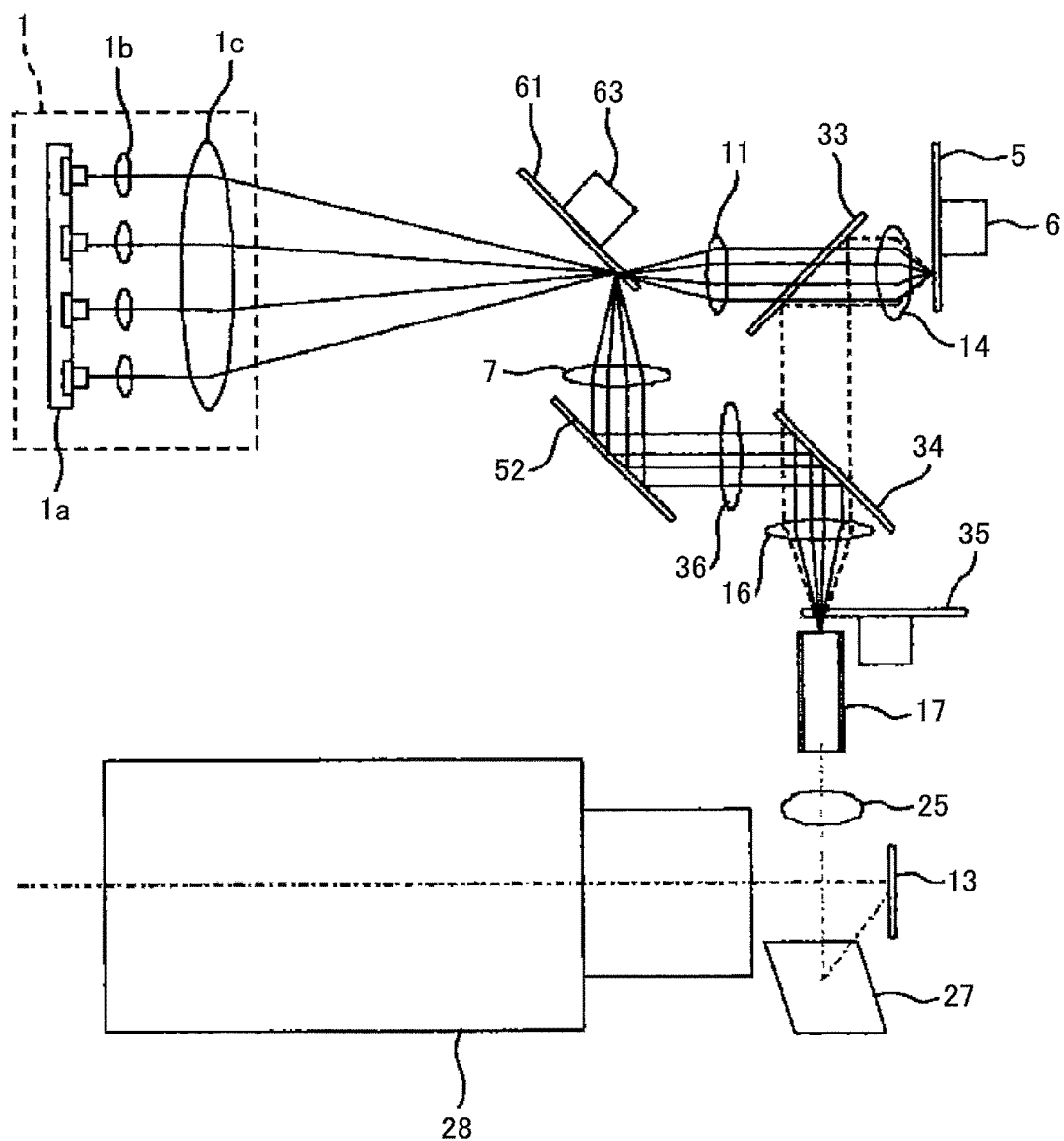
FIG. 16 is a schematic diagram depicting an example configuration of a part of a light irradiation device according to a second reference example.

FIG. 16 is a schematic diagram depicting an example configuration of a part of a light irradiation device according to the second reference example. Moreover, FIG. 17 is a plan view schematically depicting an example configuration of an optical path switching plate 61 according to the second reference example.

Figure 17:
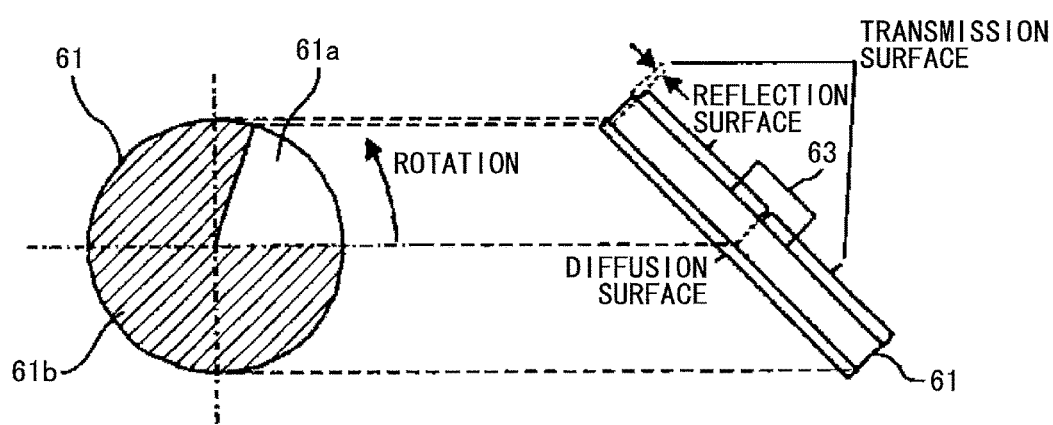
FIG. 17 is a plan view schematically depicting an example configuration of an optical path switching panel according to the second reference example.

The optical path switching plate 61 according to the second reference example, as illustrated in FIG. 17, is formed by a rotation disk for an optical path time division having a reflection diffusion region 61a and a transmission diffusion region 61b divided in a rotational direction. The reflection diffusion region 51a according to the second reference example is formed of the same reflection diffusion member as the above-described reflection diffusion plate 8. The transmission diffusion region 61b according to the second reference example is formed of the same transmission diffusion member as the above-described transmission diffusion plate 31.

Because the transmission diffusion region 61b in the optical path switching plate 61 according to the second reference example is formed of a transmission diffusion member, the transmission diffusion plate 31 provided in the first reference example can be omitted. Therefore, the number of components is reduced, cost reduction and size reduction of the light irradiation device can be achieved.

In the second reference example, diffusion surfaces of the reflection diffusion region 61a and the transmission diffusion region 61b in the optical path switching plate 61 are arranged on the same surface side. However, not limited to this, for example, the optical path switching plate 61 provided with the reflection diffusion region 61a and the transmission diffusion region 61b may be manufactured by preparing a plate in which one surface is a diffusion surface and the other surface is subjected to anti-reflection (AR) coating or reflection coating, cutting the plate which is subjected to coating, and bonding the plates with each other. On this occasion, a front and a back of the transmission diffusion surface can be arbitrarily selected.

Moreover, in the transmission diffusion region 61b in the optical path switching plate 61 according to the second reference example, only one surface serves as the diffusion surface. However, both surfaces may serve as the diffusion surfaces. Therefore, because laser light L passes through the diffusion surface twice, a diffusion effect can be enhanced.

In the embodiments and reference examples, any of the reference diffusion members that convert incident light into diffusion light and reflect the light may have a configuration in which a light transmission diffusion layer for transmitting and diffusing light is formed on a light reflection surface, as illustrated in FIGS. 4 and 5.

The embodiments, variation and reference examples are examples, and a particular effect is achieved by the present invention for each of the aspects as follows:

(Aspect A)

Aspect A is, in a light irradiation device that includes a laser light source such as a laser diode 1*a* for emitting laser light L; and a light diffusion member for converting the laser light L emitted by the laser light source into diffusion light, and emits light based on the laser light emitted by the laser light source from a light output unit such as a light tunnel 17 to the outside via an output optical path or two or more output optical paths including an optical path through which the diffusion light converted by the light diffusion member passes, the light diffusion member is a diffusion optical path changing member such as a reflection diffusion plate 8 that converts the laser light emitted by the laser light source into diffusion light and changes an optical path, the output optical path does not include an optical path on which laser light emitted toward the diffusion optical path changing member goes straight at a light diffusion position according to the diffusion optical path changing member and goes toward the light output unit.

According to the aspect A, even if the diffusion optical path changing member (or light diffusion member) arranged on the optical path of laser light drops off or is broken and laser light remaining in a non-diffused state goes straight at the light diffusion position according to the diffusion optical path changing member, the laser light does not goes to the light output unit. Therefore, laser light can be prevented from emitting directly from the light output unit to the outside.

(Aspect B)

Aspect B is, in the above-described Aspect A, at a destination to which laser light emitted toward the diffusion optical path changing member goes straight at the light diffusion position according to the diffusion optical path changing member, a laser light leaking prevention means such as an absorption member 19, a diffusion plate 22, or an illumination system case 20, that prevents the laser light from leaking to the outside of the device remaining in a non-diffused state is included.

According to the Aspect B, when laser light goes straight at the light diffusion position according to the diffusion optical path changing member remaining in a non-diffused state, laser light L remaining in the non-diffused state is surely prevented from being emitted to the outside from a part other than the light output unit (gap in the case, a ventilation hole or the like).

(Aspect C)

Aspect C is, in the above-described Aspect B, the laser light leaking prevention means is a laser light attenuation member such as an absorption member 19 that attenuates the laser light.

According to the Aspect C, high-intensity laser light can be prevented from leaking to the outside.

(Aspect D)

Aspect D is, in the above-described Aspect B, the laser light leaking prevention means is a laser light diffusion member such as a diffusion plate 22 that diffused the laser light.

According to the Aspect D, because light leaking to the outside is diffusion light, even if a part of light leaks to the outside, a problem can be reduced.

(Aspect E)

Aspect E includes, in any one of the above-described Aspects A through D, a laser light detection means such as a photo sensor 23 that detects laser light which goes straight at the light diffusion position according to the diffusion optical path changing member.

According to the Aspect E, when the diffusion optical path changing member arranged on the optical path of laser light is drops-off or is broken, and laser light remaining in a non-diffused state goes straight at the light diffusion position according to the diffusion optical path changing member, the light can be detected. Therefore, a handling operation for stopping the output of the laser light source or reporting to a user can be performed.

(Aspect F)

Aspect F uses, in the above-described Aspect E, a temperature detection means as the laser light detection means.

According to the Aspect F, laser light that goes straight at the light diffusion position according to the diffusion optical path changing member can be easily detected.

(Aspect G)

Aspect G includes, in the above-described Aspect E or F, a laser light stop controlling means such as an emergency shut-off circuit 24 that stops emission of laser light of the laser light source when the laser light detection means detects laser light.

Therefore, laser light can be surely prevented from leaking to the outside remaining in a non-diffused state.

(Aspect H)

Aspect H is, in any one of the above-described Aspects A through G, the diffusion optical path changing member is formed of a reflection diffusion member that converts laser light emitted by the laser light source into diffusion light and reflects the laser light.

According to the Aspect H, the diffusion optical path changing means can be formed more easily than a member that changes an optical path by refracting laser light.

(Aspect I)

Aspect I is, in the above-described Aspect H, the reflection diffusion member is a member in which a light transmission diffusion layer that transmits and diffuses the laser light is formed on a light reflection surface.

According to the Aspect I, from laser light injected to the light transmission diffusion layer is reflected at the light reflection surface until is output from the light transmission diffusion layer, diffusion shaping can be performed twice on a single diffusion surface on the light transmission diffusion layer. Therefore, a high diffusion performance for laser light on a single diffusion surface can be obtained. Furthermore, because the light reflection surface can be formed as a plane, high reflectance can be obtained.

(Aspect J)

Aspect J includes, in the above-described Aspect I, a wavelength conversion member such as a phosphor wheel 5 that receives laser light from the laser light source and thereby emits light of another wavelength band different from the laser light; a first output optical path for reflecting and diffusing laser light emitted by the laser light source by the reflection diffusion member and directing the laser light toward the light output unit without going through the wavelength conversion member; and a second output optical path for irradiating the wavelength conversion member with laser light emitted by the laser light source and directing light of another wavelength band emitted from the wavelength conversion member toward the light output unit.

According to the Aspect J, because in a light irradiation device that emits a plurality of wavelength bands, laser light from the laser light source can be emitted as diffusion light without performing a wavelength conversion, a configuration can be made simple. In this case, when the light diffusion member arranged on an optical path is light transmissive, if the light diffusion member drops off or is broken, laser light is emitted from the light output unit to the outside remaining in a non-diffused state. According to the Aspect J, because the light diffusion member arranged on the optical path is a diffusion optical path changing member, emission of laser light from the light output unit to the outside remaining in a non-diffused state can be suppressed.

(Aspect K)

Aspect K is an image display apparatus such as a projector including the light irradiation device according to any one of the above-described Aspects A through J; an illumination optical system such as a condenser lens 25, or reflection mirror 26, 27 that transfers light emitted from the light irradiation device to an image formation member such as an image formation panel 13; and a projection optical system such as a projection lens unit 28 that enlarges and projects an image formed in the image formation member.

According to the Aspect K, even if the diffusion optical path changing member (optical diffusion member) arranged on the optical path of laser light drops off or is broken and laser light goes straight at the light diffusion position according to the diffusion optical path changing member remaining in a non-diffused state, direct emission of laser light from the light output unit to the outside is suppressed and a safer image display apparatus can be provided.

The sequential number, 1, 2, . . . assigned to the embodiments and the reference examples, does not indicate an order of preferred embodiment and preferred reference examples.

As described above, a disclosed light irradiation device and an image display apparatus provided with the same are explained by the embodiment, variation and reference examples. However, the present invention is not limited to the above-described embodiments. It goes without saying that various variations and modifications may be made without departing from the scope of the present invention.

REFERENCE SIGNS LIST

1 light source unit
1*a* laser diode
3 optical path switching plate
3*a* reflection region
3*b* transmission region
5 phosphor wheel
8 reflection diffusion plate
8*a* light transmission diffusion layer
8*b* base material
8 reflection diffusion plate
9 dichroic mirror
10,35 color component switching plate
13 image formation panel
17 light tunnel
19 absorption member
20 illumination system case
22 diffusion plate
23 photo sensor
24 emergency shut-off circuit
28 projection lens unit
29 projection system case
31 transmission diffusion plate
41 color component/optical path switching plate
41*a* blue color component transmission region
41*b* red color component transmission region
41*c* green color component transmission region
41*d* yellow color component transmission region
45 transmission diffusion plate
51 optical path switching plate
51*a* reflection diffusion region
51*b* transmission region
61 optical path switching plate
61*a* reflection diffusion region
61*b* transmission diffusion region

What is claimed is:

1. A light irradiation device to emit light of two or more color components of laser light from a laser light source, comprising:
    a diffusion optical path change member configured to convert a first color component of the two or more color components of laser light into diffusion light and to change an optical path of the first color component of the laser light;
    a phosphor member configured to generate fluorescence of a second color component of the two or more color components of the laser light, different from the first color component, and to change an optical path of the second color component of the laser light;
    an optical path switch member configured to switch between a first optical path for directing the first color component of the laser light from the light irradiation device to the diffusion optical path change member, the optical path of the first color component being subsequently changed by the diffusion optical path change member, and a second optical path for directing the second color component of the laser light from the light irradiation device, prior to the optical path of the second color component being changed by the phosphor member, wherein laser light in a non-diffused state and traveling along an optical path from the diffusion optical path change member is prevented from being leaked from the light irradiation device;
    a laser light leaking prevention unit configured to prevent leakage of laser light, in the non-diffused state-when output from the diffusion optical path change member, wherein the laser light leaking prevention unit includes a laser light attenuation member configured to attenuate the laser light in the non-diffused state when output from the diffusion optical path change member; and
    a laser light detection unit configured to detect laser light in the non-diffused state traveling along a straight optical path at a light diffusion position and output from the diffusion optical path change member in the non-diffused state.

2. The light irradiation device of claim 1,
    wherein the laser light leaking prevention unit includes a laser light diffusion member configured to diffuse laser light output from the diffusion optical path change member in the non-diffused state.

3. The light irradiation device of claim 2, further comprising
    a laser light stop control unit configured to control the laser light source to stop emitting laser light in response to the laser light detection unit detecting the laser light in the non-diffused state traveling along a straight optical path at a light diffusion position.

4. An image display apparatus comprising:
    the light irradiation device of claim 2;
    an illumination optical system configured to transfer light emitted from the light irradiation device to an image formation member; and
    a projection optical system configured to enlarge and project an image formed in the image formation member.

5. The light irradiation device of claim 1, further comprising a laser light stop control unit configured to control the laser light source to stop emitting laser light in response to the laser light detection unit detecting the laser light in the non-diffused state traveling along a straight optical path at the light diffusion position.

6. The light irradiation device of claim 1,
wherein the diffusion optical path change member includes a reflection diffusion member configured to convert the laser light emitted by the laser light source into diffusion light and configured to reflect the laser light.

7. The light irradiation device of claim 6,
wherein in the reflection diffusion member, a light transmission diffusion layer, configured to transmit and diffuse the laser light, is formed on a light reflection surface.

8. The light irradiation device of claim 6,
wherein, in the reflection diffusion member, a light transmission diffusion layer is formed on a planar light reflection surface, and
wherein the reflection diffusion member is arranged such that the laser light, upon passing through the light transmission diffusion layer, is reflected at a light reflection surface, and will pass through the light transmission diffusion layer again.

9. The light irradiation device of claim 1,
wherein the optical path switch member includes a rotation disk including a transmission region and a reflection diffusion region.

10. The light irradiation device of claim 9,
wherein the transmission region of the rotation disk is formed of a transmission diffusion member configured to diffuse light.

11. An image display apparatus comprising:
the light irradiation device of claim 1;
an illumination optical system configured to transfer light emitted from the light irradiation device to an image formation member; and
a projection optical system configured to enlarge and project an image formed in the image formation member.

12. The light irradiation device according to claim 1, wherein the laser light detection unit includes a temperature detection unit.

13. The light irradiation device of claim 1,
wherein the phosphor member includes a rotation disk.

14. A The light irradiation device to emit light of two or more color components of laser light from a laser light source, comprising:
a diffusion optical path change member configured to convert a first color component of the two or more color components of laser light into diffusion light and to change an optical path of the first color component of the laser light;
a phosphor member configured to generate fluorescence of a second color component of the two or more color components of the laser light, different from the first color component, and to change an optical path of the second color component of the laser light;
an optical path switch member configured to switch between a first optical path for directing the first color component of the laser light from the light irradiation device to the diffusion optical path change member, the optical path of the first color component being subsequently changed by the diffusion optical path change member, and a second optical path for directing the second color component of the laser light from the light irradiation device, prior to the optical path of the second color component being changed by the phosphor member, wherein laser light in a non-diffused state and traveling along an optical path from the diffusion optical path change member is prevented from being leaked from the light irradiation device, wherein the laser light leaking prevention unit includes a laser light diffusion member configured to diffuse laser light output from the diffusion optical path change member in the non-diffused state; and
a laser light detection unit configured to detect laser light in the non-diffused state traveling along a straight optical path at the light diffusion position and output from the diffusion optical path change member in the non-diffused state.

15. The light irradiation device according to claim 14,
wherein the laser light detection unit includes a temperature detection unit.

* * * * *